US011172405B2

(12) United States Patent
Kim et al.

(10) Patent No.: US 11,172,405 B2
(45) Date of Patent: Nov. 9, 2021

(54) METHOD FOR CHECKING CHANGE IN WIRELESS CONNECTION TYPE OF TERMINAL IN THIRD-PARTY APPLICATION SERVER

(71) Applicant: Samsung Electronics Co., Ltd., Suwon-si (KR)

(72) Inventors: Sunghoon Kim, Seoul (KR); Jungje Son, Yongin-si (KR); Hoyeon Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/637,846

(22) PCT Filed: Aug. 14, 2018

(86) PCT No.: PCT/KR2018/009334
§ 371 (c)(1),
(2) Date: Feb. 10, 2020

(87) PCT Pub. No.: WO2019/035638
PCT Pub. Date: Feb. 21, 2019

(65) Prior Publication Data
US 2020/0252837 A1 Aug. 6, 2020

(30) Foreign Application Priority Data
Aug. 14, 2017 (KR) .................. 10-2017-0102936

(51) Int. Cl.
*H04W 28/00* (2009.01)
*H04W 28/24* (2009.01)
(Continued)

(52) U.S. Cl.
CPC ......... *H04W 28/24* (2013.01); *H04L 61/3085* (2013.01); *H04L 67/14* (2013.01);
(Continued)

(58) Field of Classification Search
CPC ....... H04W 28/24; H04W 76/27; H04W 4/24; H04W 8/186; H04W 36/0011;
(Continued)

(56) References Cited

U.S. PATENT DOCUMENTS 10,616,934 B2 * 4/2020 Talebi Fard .......... H04W 48/00
2014/0129692 A1 * 5/2014 Boden ................. H04L 41/0893
709/223

(Continued)

FOREIGN PATENT DOCUMENTS

CN        104581670 A    4/2015
KR   10-2017-0044926 A   4/2017

OTHER PUBLICATIONS

SA WG2 Meeting #122 (Jun. 26-30, 2017, San Jose Del Cabo, Mexico; Samsung; TS 23.502: Roaming support for AF influenced Traffic steering; 6.5.3) (Year: 2017).*

(Continued)

*Primary Examiner* — Khai M Nguyen

(57) ABSTRACT

The present disclosure relates to a communication technique for converging IoT technology with 5G communication systems for supporting higher data transmission rates than 4G systems and to a system thereof. The present disclosure can be applied to intelligent services (e.g., smart home, smart building, smart city, smart car or connected car, health care, digital education, retail business, security- and safety-related services, etc.) on the basis of 5G communication technology and IoT-related technologies. The method for operating a policy and charging function (PCF) according to one embodiment of the present invention comprises the steps of: receiving a message which is generated by an application function (AF) and requests a change in the traffic route of terminal; checking priority information of the terminal, regarding services provided by the AF, included in (Continued)

the message; and changing the protocol data unit (PDU) session connection of the terminal on the basis of the priority information.

12 Claims, 5 Drawing Sheets

(51) Int. Cl.
  *H04W 76/27* (2018.01)
  *H04L 29/12* (2006.01)
  *H04L 29/08* (2006.01)
  *H04W 4/24* (2018.01)
  *H04W 8/18* (2009.01)
  *H04W 36/00* (2009.01)
  *H04W 48/18* (2009.01)
  *H04W 80/10* (2009.01)

(52) U.S. Cl.
  CPC .............. *H04W 4/24* (2013.01); *H04W 8/186* (2013.01); *H04W 36/0011* (2013.01); *H04W 48/18* (2013.01); *H04W 76/27* (2018.02); *H04W 80/10* (2013.01)

(58) Field of Classification Search
  CPC .. H04W 48/18; H04W 80/10; H04L 61/3085; H04L 67/14
  See application file for complete search history.

(56) References Cited

U.S. PATENT DOCUMENTS

2015/0245238 A1* 8/2015 Zhang ............... H04W 28/0215
                                                          370/230
2018/0317157 A1* 11/2018 Baek ...................... H04W 76/22
2019/0357301 A1* 11/2019 Li .......................... H04M 15/66

OTHER PUBLICATIONS

SA WG2 Meeting #122 (Jun. 26-30, 2017, San Jose Del Cabo, Mexico; Samsung; TS 23.502: Roaming support for AF influenced traffic steering) (Year: 2017).*
ISA/KR, International Search Report and Written Opinion of the International Searching Authority, International Application No. PCT/KR2018/009334, dated Nov. 16, 2018, 12 pages.
3GPP TS 23.501 V1.0.0 (Jun. 2017), Technical Specification, 3rd Generation Partnership Project; Technical Specification Group Services and System Aspects; System Architecture for the 5G System; Stage 2 (Release 15), Jun. 2017, 146 pages.
Samsung, "TS 23.502: Roaming support for AF influenced traffic steering," S2-174407 (revision of S2-17xxxx), SA WG2 Temporary Document, SA WG2 Meeting #122, 26-30 San Jose Del Cabo, Mexico, Jun. 2017, 6 pages.

* cited by examiner

METHOD FOR CHECKING CHANGE IN WIRELESS CONNECTION TYPE OF TERMINAL IN THIRD-PARTY APPLICATION SERVER

CROSS-REFERENCE TO RELATED APPLICATIONS

This application is a 371 National Stage of International Application No. PCT/KR2018/009334, filed Aug. 14, 2018, which claims priority to Korean Patent Application No. 10-2017-0102936, filed Aug. 14, 2017, the disclosures of which are herein incorporated by reference in their entirety.

BACKGROUND

1. Field

The disclosure relates to a communication system and, more particularly, to a method in which a third-party application server negotiates with a 5G system, makes a request for monitoring a change in state information of a terminal, and receives a result thereof.

In addition, the disclosure relates to communication system and, more specifically, to a technique in which a third-party application server makes a request to a 5G system for changing the traffic path of a terminal to be closer to the location of the terminal, whereby the 5G system changes the traffic path of the terminal to a local data network close to the location of the terminal, thereby supporting shorter latency and broadband transmission.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a aloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

In line with this, various attempts have been made to apply 5G communication systems to IoT networks. For example, technologies, such as a sensor network, machine-to-machine (M2M) communication, machine-type communication (MTC), and the like, are being implemented using 5G communication techniques, such as beamforming, MIMO, array antennas, and the like. The application of a cloud radio access network (cloud RAN) as the above-described big-data processing technology may also be considered as an example of convergence between the 5G technology and the IoT technology.

With the recent development of long-term evolution (LTE) and LTE-Advanced, a method and a device by which a third-party application server negotiates with a 5G system, makes a request for monitoring a change in state information of a terminal, and receives a result thereof are required.

SUMMARY

The disclosure proposes a method in which a third-party application server (3rd-party AS) recognizes an access technology type (hereinafter, referred to as an "access type" as an abbreviation) by which a terminal access a 5G system in a mobile communication network. The access type may be classified into 3gpp access that is a wireless access technique defined by 3GPP and non3gpp access that is a wireless access technique defined by an organization other than 3GPP (e.g., WiFi as 802.11).

In addition, the disclosure relates to a method in which a third-party application server (3rd-party AS) makes a request to a 5G system for changing the traffic path of a terminal to a local data network close to the location of the terminal in a mobile communication network, and in which the 5G system changes a data network connection path of the terminal to a local data network, based on the current location of the corresponding terminal, according to the request while applying, to the 5G system, the priority that the third-party application server applies to a user. For example, in the case of NETFLIX or AMAZON, a third-party application server corresponding to NETFLIX or AMAZON is required to make a request to the 5G system for preferentially processing a traffic change for a priority user who pays more and uses services thereof. Therefore, the disclosure relates to a method of performing an operation of, in the case where the 5G system is very congested due to traffic connection of UEs or a gateway connected to a local data network is congested, preferentially processing a corresponding priority terminal and connecting the same to the local data network, or disconnecting a low-priority terminal using the local data network therefrom and connecting a high-priority user to the local data network.

A method of operating policy and charging function (PCF) in a wireless communication system according to an embodiment of the disclosure may include: receiving a message produced by an application function (AF) and requesting change of a traffic path of a terminal; identifying priority information of the terminal for a service provided by the AF, which is included in the message; and changing a protocol data unit (PDU) session connection of the terminal, based on the priority information.

According to an embodiment, the message may further include at least one of a terminal ID capable of identifying the terminal, an IP address used by the terminal in communication with the AF, and a group ID associated with the terminal.

According to an embodiment, if it is determined that a user plane function (UPF) of the terminal is to be relocated according to the priority information, the terminal may be connected to a local UPF.

According to an embodiment, the message may be transmitted from the AF to the PCF through a network exposure function (NEF).

The method of operating the PCF may further include selecting one of an arbitrary terminal, a terminal having the longest inactivity time of the PDU session, and a terminal satisfying a predetermined amount of data usage in a local user plane function (UPF) as a terminal for change of the PDU session connection.

A method of operating an application function (AF) in a wireless communication system according to an embodiment of the disclosure may include: producing priority information of a terminal for a service provided by the AF; transmitting a message including the priority information and requesting traffic path change of the terminal; and receiving a response message to the traffic path change of the terminal. In this case, a protocol data unit (PDU) session connection of the terminal may be changed based on the priority information.

According to an embodiment, the message may further include at least one of a terminal ID capable of identifying the terminal, an IP address used by the terminal in communication with the AF, and a group ID associated with the terminal.

According to an embodiment, if it is determined that a user plane function (UPF) of the terminal is to be relocated according to the priority information, the terminal may be connected to a local UPF.

According to an embodiment, the message may be transmitted from the AF to the PCF through a network exposure function (NEF).

According to an embodiment, one of an arbitrary terminal, a terminal having the longest inactivity time of the PDU session, and a terminal satisfying a predetermined amount of data usage in a local user plane function (UPF) may be selected as a terminal for change of the PDU session connection.

A policy and charging function (PCF) in a wireless communication system according to an embodiment of the disclosure may include: a transceiver; and a controller connected to the transceiver and configured to perform control so as to receive a message produced by an application function (AF) and requesting change of a traffic path of a terminal, identify priority information of the terminal for a service provided by the AF, which is included in the message, and change a protocol data unit (PDU) session connection of the terminal, based on the priority information.

An application function (AF) in a wireless communication system according to an embodiment of the disclosure may include: a transceiver; and a controller connected to the transceiver and configured to produce priority information of a terminal for a service provided by the AF, transmit a message including the priority information and requesting a traffic path change of the terminal, and receive a response message to the traffic path change of the terminal. In this case, a protocol data unit (PDU) session connection of the terminal may be changed based on the priority information.

As a result of an embodiment of the disclosure, if a 3rd-party AS is aware of information on the access type of the terminal, the 3rd-party AS may optimally process services provided to the terminal served by the 3rd-party AS. For example, if a terminal accesses the 5G system through WiFi, it is possible to perform control such that a large amount of data or streaming data is transmitted through the corresponding connection. This may reduce the load of 3gpp access, while saving data fees of the terminal. Alternatively, if a terminal using voice over IP through the 3rd-party AS switches to connection through 3gpp access, the 3rd-party AS may make a switch in order to transmit voice over IP data through 3gpp access for reliable voice data transmission. This may improve the voice over IP service quality with respect to the user.

According to another embodiment of the disclosure, in the case where a priority user who pays more and uses third-party services managed by a third-party application service provider corresponding to NETFLIX, AMAZON, or the like, other than a mobile communication carrier, if a third-party application server makes a request to the 5G system for changing the traffic path of a terminal to a local data network, the 5G system may connect the terminal to the local data network by reflecting the user priority of the third-party application service. This may be used to guarantee the quality of a specific service provided to a priority user who pays more for better services. For example, in the case where multiple users wish to connect to a local data network or a local gateway connected to the local data network, a request of a priority user may be preferentially processed, thereby providing faster services. As another example, if a local data network or a local gateway connected to the local data network is saturated or congested due to a big crowd of users, the connection of a low-priority user with the local data network or the local gateway connected to the local data network may be released in order to establish a connection of a high-priority user. Therefore, high-priority users may be provided with better quality of services than low-priority users, which may cause users to subscribe to services that pay higher tees to the third-party application service provider. In addition, the effect of the disclosure may also be expected when applying the priority between groups in the case where the third-party application service requests traffic path change in group units.

DETAILED DESCRIPTION

Figure 1:
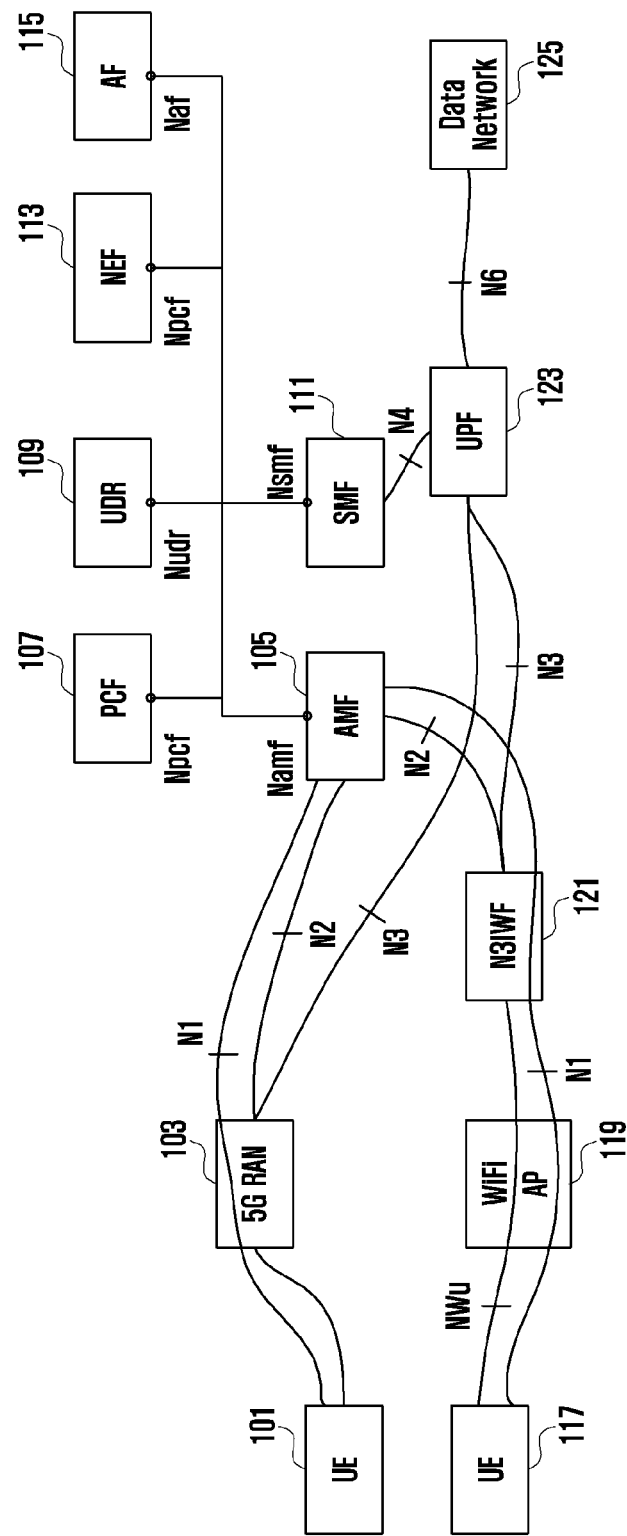
FIG. 1 is a diagram illustrating a network architecture in which a 5G system and a 3rd-party AS (AF) are connected to obtain information on a terminal.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

In a description of embodiments of the disclosure, a description of technologies that are already known to those skilled in the art and are not directly relevant to the disclosure is omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

First Embodiments

Consideration is being given to implementation of a 5G communication system in super-high-frequency (mmWave) bands (e.g., a 60 GHz band) so as to accomplish higher data rates. In order to reduce pathloss of radio waves and increase the propagation distance of radio waves in super-high-frequency bands, techniques, such as beamforming, massive multiple-input multiple-output (MIMO), full-dimensional MIMO (FD-MIMO), array antennas, analog beamforming, and large-scale antennas, are being discussed in 5G communication systems.

In addition, development is under-way for system network improvement in 5G communication systems, based on evolved small cells, advanced small cells, cloud radio access networks (cloud RANs), ultra-dense networks, device-to-device (D2D) communication, wireless backhaul, moving networks, cooperative communication, coordinated multi-points (CoMPs), reception-end interference cancellation, and the like.

Furthermore, in the 5G system, hybrid FSK and QAM modulation (FQAM) and sliding window superlocation coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the architecture for implementing communication with a 3rd-party application server in the 3GPP next-generation communication system is under constant discussion. Accordingly, there is an increasing demand for a method of efficiently providing network functions of a core network (CN) to an external third-party application server and improvement thereof. As a technique using the same, the third-party application server may use an API called a "monitoring event". The monitoring event API is provided to the third-party application server by the 5G system and has a function of, if the 5G system detects terminal events, such as a change in the terminal location, a change in the roaming state, reachability, availability after downlink data failure, and the like, transmitting the result or content thereof to the third-party application server.

Hereinafter, for the convenience of description, some terms and names defined in the $3^{rd}$-generation partnership project long-term evolution (3GPP) standard may be used. However, the disclosure is not limited to the above terms and names, and may be equally applied to systems conforming to other standards.

FIG. 1 is a diagram illustrating a network architecture in which a 5G system and a 3rd-party AS (AF) are connected to obtain information on a terminal.

A description of network entities or network nodes in the disclosure, shown in FIG. 1, will be made as follows.

Referring to FIG. 1, a 5G terminal 101 may access a 5G system or a 5G core network through a 5G RAN 103 called "3gpp access", which is a wireless access network defined in 3gpp. In addition, the 5G terminal 117 may be connected to a device called a "non3GPP interworking function (N3IWF)" 121 through a wireless access network (e.g., WiFi called "IEEE 801.11"), which is not defined in 3gpp and is called "non3gpp access" 119, and the N3IWF 121 may be connected to a 5G core network or a 5G system, thereby connecting a terminal accessing thereto through non3gpp access to the 5G system or the 5G core network (hereinafter the 5G system will be regarded as being the same as the 5G core network). The 5G core network may include the following network functions.

An access and mobility management function (AMF) 105 is a network function of managing the mobility of a terminal. A session management function (SMF) 111 is a network function of managing a packet data network connection provided to a terminal. A policy and charging function (PCF) 107 is a network function of applying the service policy, the charging policy, and the policy of a PDU session of a mobile communication carrier to a terminal.

A network exposure function (NEF) 113 may access information for managing a terminal in the 5G network, and may execute configuration change of mobility management and configuration of mobility management context specialized to the corresponding terminal, subscription to mobility management events of the corresponding terminal, configuration of session management and session management context of the corresponding terminal, configuration of charging information of the corresponding terminal, request for change of a PDL session policy with respect to the corresponding terminal, and small-data transmission with respect to the terminal.

The UPF 123 stands for a user plane function and denotes a device called a "gateway" in a data transmission network, which relays data transmitted by a terminal through a wireless network to an external data network.

The N3IWF 121 is connected to an AMF 105 through control signaling, and is connected to a UPF 123 through an N3 interface for data transmission. A UDR 109 stands for a user data repository and stores data on a user of a terminal, which is commonly referred to as a "home subscriber server (HSS)" in a 3G/4G system. Therefore, the UDR may be a device storing mobile communication system subscription information of a user of the terminal and the like, and may perform authentication and authorization of various 5G functions provided to the terminal.

An AF 115 indicates an application function that is allowed to use the API with the devices in the 5G system. The AF 115 may be a third-party application server, or may be an application server directly operated by a mobile communication carrier. In the disclosure, a device called "AF" may indicate a third-party application server, or may also indicate an application server directly operated by the mobile communication carrier. The AMF 105, the SMF 111, the PCF 107, the UDR 109, the NEF 113, the AF 115, and the like have a structure called a "service-based interface", which follows a method in which respective network functions provide APIs, and the APIs are requested and used by other network functions.

For example, if the APIs provided by the AMF 105 are "a", "b", and "c", the SMF 111 and the PCF 107 or the NEF 113 may request APIs "a", "b", and "c", thereby using the functions provided by the AMF. That is, if a third-party application server wishes to obtain the location of a terminal in relation to mobility management, the third-party application server may obtain the location of the terminal from the AMF 105 using an API for checking and indicating the location of the terminal (for example, a location-reporting API), which is provided by the AMF 105. Alternatively, when requesting a change of traffic routing with respect to a session used by the terminal, the third-party application server may change a routing path for the PDU session provided to the terminal by a core network using an API supporting traffic steering (e.g., a traffic steeling API) provided by the PCF 107.

The access type described in the disclosure may be defined as follows. In the case where a 5G terminal accesses a 5G system or a 5G core network through a 5G RAN called "3gpp access", which is a wireless access network defined in 3gpp, this may indicate that the access was made using 3gpp as an access type. Furthermore, in the disclosure, the 3gpp access may be divided into an improved version of E-UTRAN as 4G technology (evolved E-UTRAN or eLTE) and a new radio (NR) as 5G technology. That is, a 3gpp access type, among the access types, may be classified into eLTE and NR. If a 5G terminal accesses a device called a "non3GPP interworking function (N3IWF)" through a wireless access network (e.g., WiFi called "IEEE 801.11"), which is not defined in 3gpp and is called "non3gpp access", makes an IP connection, and establishes a connection of terminal-N3IWF-AMF through the IP connection, this may indicate that the access was made using non3gpp as the access type. Although non3gpp access primarily indicates WiFi, it may be applied to any wireless access network technology defined by IEEE or other standard organizations, and may encompass technologies capable of communication with a terminal through IP.

Figure 2:
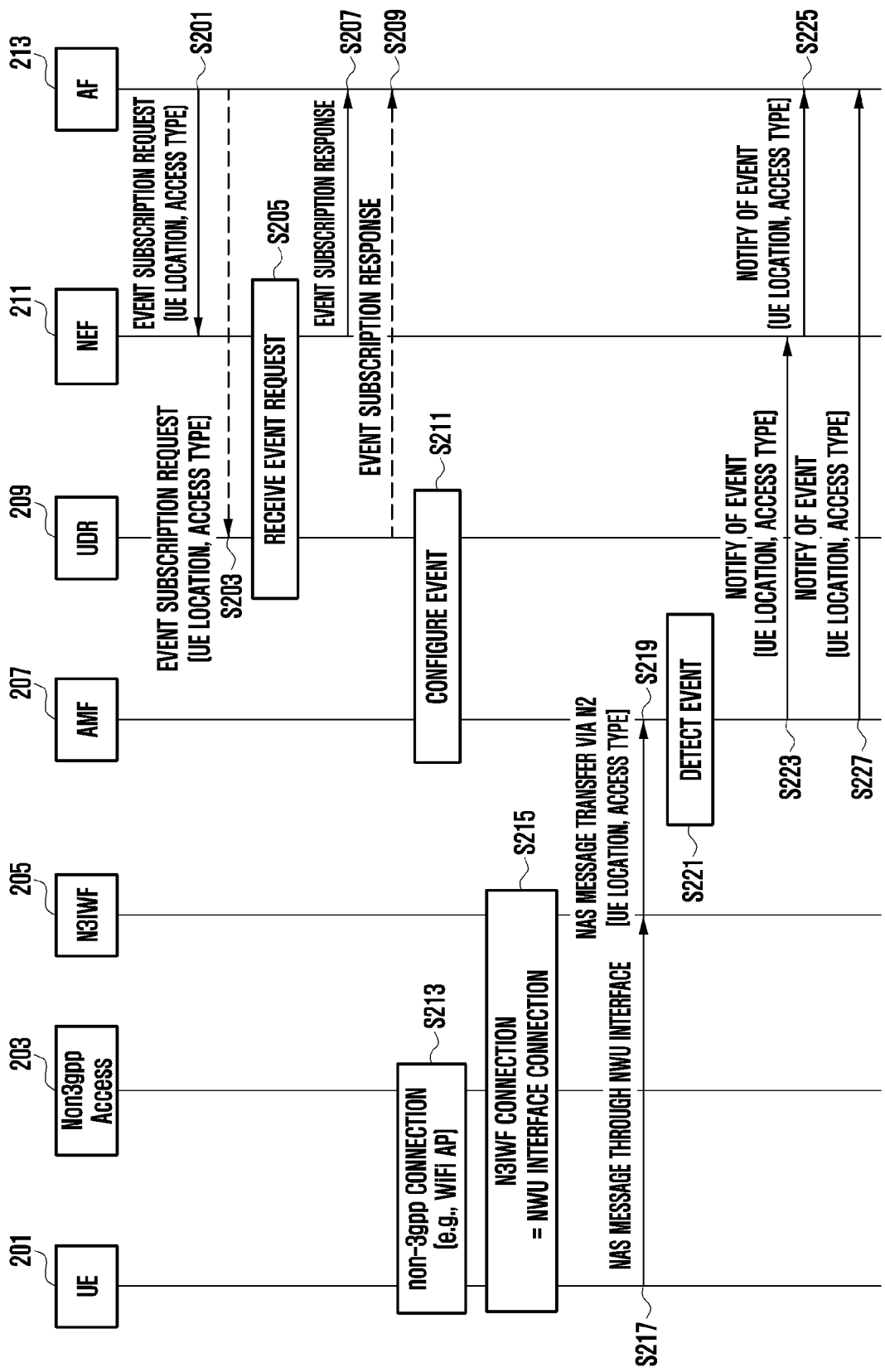
FIG. 2 is a diagram illustrating a procedure in which a 3rd-party AS makes a request to a 5G system for monitoring a change in the access type of a terminal, and if a corresponding event is detected, the 5G system informs the 3rd-party AS of a result thereof, according to an embodiment of the disclosure.

FIG. 2 is a diagram illustrating a method in which an AF makes a request to an AMF for monitoring an event for the access type or the access type and location information, and in which the AMF monitors and detects an event and then transmit the result thereof to the AF.

The disclosure primarily relates to an embodiment in which the AF 213 requests the access type, and, in response thereto, the AF 213 is informed of whether the terminal 201 is connected to the eLTE, the NR, or the 5G-RAN including both (i.e., 3gpp access) or whether the terminal 201 is connected through non3gpp access.

Referring to steps S201 and S203 in FIG. 2, according to an embodiment of the disclosure, the AF may intend to recognize the access type used by a terminal that is provided with application services from the AF. The AF may wish to know only the access type of the terminal or the location of the terminal and the access type used by the terminal at the corresponding location.

The disclosure relates to the above event (an event for the access type or an event for the location and access type of the terminal). In addition, the disclosure encompasses the case of recognizing the access type of the terminal using another event. (Hereinafter, the event denotes an event for the access type or for the location and access type of a terminal, or another event for recognizing the access type together with other states of the terminal.)

The AF determining that monitoring for the event is required configures an event subscription message according to an embodiment of the disclosure and transmits the same to the NEF in step S201 or to the UDR in step 203. The message may include information on the requested event, an ID (e.g., an external ID) for identifying the terminal between the AF and the 5G system or a terminal group ID (e.g., an external group ID). The ID is mapped to a terminal ID or a group ID, which is used in the form of terminal subscription information in the 5G system, in the UDR (or the UDM or the HSS). Therefore, the 5G system may identify the external ID or the external group ID by mapping the same to the IMSI {or a subscriber permanent identifier (SUPI)}, which is a terminal ID used in the 3gpp system, or an internal group identifier, which is a terminal group ID. In addition, the message in step S201 or step S203 may include information on the time taken for the event monitoring (how long the monitoring will be performed) or information on whether or not the event monitoring is performed once. In addition, in the case of a request for a group, the message may include information on the time during which event-monitoring results for the corresponding group are collected and contained in a single monitoring result report to then be transmitted.

The AF transmits a message through the NEF in step S201 in FIG. 2 in the case where the AF is not directly connected to the AMF. Since the AF is not authorized to make a request to the AMF for APIs, the AF makes a request to the NEF first, and the NEF performs a procedure in which the UDR (or the UDM or the HSS) (hereinafter, collectively referred to as a "UDR") authorizes the AF to make a request for event monitoring through step S205 in FIG. 2.

In step S201 in FIG. 2, the AF uses an API provided by the NEF, and in step S205 in FIG. 2, the NEF processes the event request using the API provided by the UDR. After the AF is authorized to make a request for the event monitoring through the UDR, the NEF informs the AF that the event monitoring request has been accepted in step S207 in FIG. 2. If the event monitoring request is not accepted, the UDR transmits a failure response to the NEF, and the NEF transfers the same to the AF. The event monitoring request may not be accepted in the case where the AF is not authorized to request the corresponding event, where the corresponding terminal is not a registered terminal, where the terminal corresponding to the external ID or the external group ID cannot be found, or where the corresponding terminal is a fixed wireless terminal that uses only a single access (3gpp access only or non-3gpp access only). The UDR includes the above reason for failure in the response to the NEF, and the NEF relays the same to the AF.

In step S203 in FIG. 2, the AF may make a request to the AMF for event subscription in the case where the AF has a trust relationship with a corresponding mobile communication carrier and thus has authority to directly use APIs of the UDR. The AF transmits an event subscription request to the UDR using the API provided by the UDR. Upon receiving the request, the UDR performs an operation to permit the event monitoring request of the AF.

After permitting the request, the UDR informs the AF that the event monitoring request has been accepted in step S209 in FIG. 2. If the event monitoring request is not permitted, the UDR transmits a failure response to the AF. The event monitoring request may not be permitted in the case where the AF is not authorized to request the corresponding event, where the corresponding terminal is not a registered terminal, where the terminal corresponding to the external ID or the external group ID cannot be found, or where the corresponding terminal is a fixed wireless terminal that uses only a single access (3gpp access only or non-3gpp access only). The UDR may transmit the above reason for failure to the AF in step S209 in FIG. 2.

According to step S211 in FIG. 2, the UDR finds an IMSI or SUPI, which is a terminal ID corresponding to the external ID, or finds an internal group ID corresponding to the external group ID and determines the IMSI or SUPI, which is a terminal ID belonging to the group. Thereafter, the UDR finds an AMF serving the corresponding terminal. When the terminal is registered in the AMF, the AMF transmits update information on the terminal served by the AMF to the UDR, so that the UDR stores the information. The UDR that has determined the terminal for the event monitoring request and the serving AMF of the terminal configures an event for the corresponding AMF. This may be performed using API-subscription data update—for updating the subscription information of the terminal. In other words, if the UDR configures an event request, the configuration is included in the subscription information of the terminal, and this information is transferred to the AMF so that the AMF performs event monitoring.

The AMF configured for event monitoring in step S211 in FIG. 2 starts monitoring whether or not an event requested for the corresponding terminal occurs. The message in step S211 may include information on the time taken for the event monitoring requested by the AF (how long the monitoring will be performed) or information on whether or not the event monitoring is performed once. In addition, in the case of a request for a group, the message may include information on the time during which event-monitoring results for the corresponding group are collected and contained in a single monitoring result report to then be transmitted.

The terminal may attempt to access the 5G system through non-3gpp access. The terminal may access a WiFi AP or the like to then be assigned an IP address, and may transmit signaling to the N3IWF in order to establish a connection with the N3IWF. This procedure follows a N3IWF access method defined in 3GPP.

If the terminal is connected to the N3IWF through non3gpp access (e.g., WiFi), the N3IWF is able to transmit NAS messages received from the terminal to the AMF through an N2 connection. In order to access the 5G system through non3gpp access, the terminal transmits a NAS message called "registration request" to the AMF. The N3IWF configures a N2 message in order to forward the NAS message received from the terminal to the AMY. The N2 indicates an interface between the N3IWF and the AMF, and may include a NAS message received from the terminal in the N2 message to then be transmitted. When the N3IWF transmits the NAS message of the terminal to the AMF, the N3IWF may include the NAS message in the N2 message, and may include at least one of the current location information or the access type of the terminal in the N2 message.

The current location information of the terminal may be a tracking area ID, which may be a tracking area ID used only in non3gpp access. This information is used by the N3IWF to determine the serving area. Furthermore, the N3IWF may determine the region from which the IP address is transmitted, based on the IP address of the terminal, and may derive a tracking area ID conforming to the corresponding location, or may also derive geographical information (GPS information, civic address, postal code, ZIP code, etc.) about the corresponding location in other ways. The N3IWF may include the current location information of the terminal determined as described above in the N2 message.

The AMF that receives the NAS message of the terminal completes the NAS procedure with the terminal. For example, if the terminal requests registration, the corresponding registration operation is completed.

In step S221 in FIG. 2 according to an embodiment of the disclosure, if the terminal requests registration through non3gpp access, and if the AMF and the terminal successfully complete this procedure, the AMF may determine that the terminal have accessed the 5G system through non3gpp access. Accordingly, since the terminal, which has not been connected through non3gpp access, is now connected through non3gpp access, the AMF may determine that a condition for the configured event is satisfied in step S211 in FIG. 2. The AMF may determine the same by checking the access type in the N2 message transmitted by the N3IWF. Alternatively, if the location information of the terminal is a tracking area ID used exclusively for non3gpp as a result of checking the location information of the terminal transmitted by the N3IWF, the AMF may determine that the terminal is connected through non3gpp access. Alternatively, if the NAS message transmitted by the terminal includes an identifier indicating that the terminal is connected through non3gpp, based on this, the AMF may determine that the terminal is connected through non3gpp. Alternatively, the AMF may determine the location and the access type of the terminal by identifying the location information and the access type of the terminal included in the N2 message transmitted by the N3IWF or by identifying the access type included in the NAS message transmitted by the terminal.

In another specific embodiment, if the terminal using non3gpp access performs registration through 3gpp access, the AMF may determine that a connection of the terminal through 3gpp access has occurred. Accordingly, in the case where the event requested by AF in step S201 or step S203 in FIG. 2 is changing the access type of the terminal, if the terminal having accessed the 5G system through the non3gpp access accesses the same through 3gpp access, the AMF may determine that the condition configured for the event has been satisfied.

That is, the AF may configure the access type change of the terminal as an event, and the AMF may determine the access type change between non3gpp and 3gpp to be a corresponding event condition, and may determine the access type by which the terminal is currently connected to be an event-monitoring, result. In addition, this may also be applied to the case in which the terminal has both the 3gpp access type and the non3gpp access type by establishing a connection through non3gpp access in addition to the connection through 3gpp access. In this case, the AMF may include identifiers for both 3gpp access and non3gpp access in order to indicate that connections are made both by the 3gpp access type and by the non3gpp access type.

Similarly, if the terminal is connected through two accesses and releases one access, that is, if the AMF determines that the terminal using both 3gpp access and non3gpp access releases the non3gpp access and maintains only the 3gpp access (which is determined according to a deregistration procedure or a registration procedure performed with the terminal), the AMF may determine releasing the non3gpp access and maintaining only the 3gpp access to be an event, thereby including only the 3gpp access in the event result for the access type.

As another example, whenever the AMF recognizes a new access type of the terminal, the AMF may determine the same to be an event result. That is, whenever the current access type of the terminal is determined, the AMF may determine the same to be an event result, instead of determining the change of the access type to be the event result, thereby configuring an event notification. In addition, if the terminal connected through two access types releases only one access type, since the access type used by the terminal is changed from two types to a single type, it may be determined that this corresponds to an event for changing the access type of the terminal, and thus only the valid access type information currently possessed by the terminal may be determined to be an event result, thereby configuring an event notification.

The AMF detecting the event in step S221 in FIG. 2 notifies the AF of the result directly or through the NEF (step S223 or S227 in FIG. 2). The event result may be transmitted to the NEF in step 223 in the case in which the AF cannot be directly connected with network functions of the 5G system and, that is, in the case in which event monitoring is requested in step S201 and the UDR provides an address or ID of the NEF when configuring the same in the AMF. This message may include the changed access type of the terminal or the current location information and the changed access type of the terminal as a result of the event. Alternatively, the message may include the result and access type of another event. The NEF receiving the event notification in step S223 identifies the AF that has requested the corresponding event, and then notifies the corresponding AF of the event result.

In this case, the event result may include the access type, the location of the terminal, or results of other events, which are received in step S223 in FIG. 2. The event result may be transmitted through step S227 in FIG. 2 in the case where the AF is able to be directly connected to network functions of the 5G system and, that is, in the case where the event monitoring is requested in step S203 and the UDR informs the AMF of the address or ID of the AF when configuring the same in the AMF. The message may include the changed access type of the terminal as a result of the event or the current location information and the changed access type of the terminal.

According to an embodiment of the disclosure, the AF may receive the event result, and may make the following determination. For example, if the AF receives an event result indicating that the terminals connected through non3gpp access in the state of being aware that the terminal is connected through 3gpp access, the AF may determine that the connection through 3gpp access has been removed and the terminal is connected only through non3gpp access. Alternatively, the AF may determine that the connection through non3gpp access has been added while maintaining the connection through 3gpp access. This may be effective in the case where only the connection through non3gpp access is established or released while the connection through 3gpp access remains. Alternatively, if the AF receives an event result for the terminal indicating a non3gpp access type, and if the AF does not receive, from the 5G system, a notification indicating that the terminal was previously connected through 3gpp access, the AF may determine that the terminal is connected only through non3gpp access. As another example, the AF may receive all the access types currently used by the terminal as an event result. In this case, if the received access types are 3gpp access and non3gpp access, the AF may determine that the terminal is connected by two access types. If the received access type is 3gpp access, the AF may determine that the terminal is connected only by 3gpp access type, and if the received access type is non3gpp access, the AF may determine that the terminal is connected only by non3gpp access type.

In another specific embodiment of the disclosure, the UDR may perform the following operations in the case where the UDR is aware that the terminal is registered through 3gpp access or non3gpp access. If an event subscription request is received in step S201 or S203 in FIG. 2, the UDR determines whether or not the request includes event monitoring for the access type of the terminal. Thereafter, the UDR may identify the context of UE, which is stored therein, or may identify the AMF currently serving the UE, thereby checking registration context thereof. As a result of the checking above, the UR may determine the access type by which the terminal for the event request is currently registered in the 5G system. This is due to the fact that the access type by which the terminal is connected may be transmitted to the AMF through the registration procedure, and the AMF may transmit the same to the UDR. Therefore, the terminal-related context stored in the UDR may include the access type by which the terminal is currently registered, and the UDR may identify the same, and may include a result of the event requested by the AF (the access type by which the terminal is registered) in the response message, thereby transmitting a notification thereof, in reply in step S201 or S203, that is, when performing step S205, S207, or S209 in FIG. 2.

In the case where the UDR manages the access type by which the terminal is registered, the event configuration requested by the AF in step S201 or S203 may be made without performing step S211, and, in this case, the UDR monitors an event, based on the context of the terminal stored therein, and transmits a result thereof, as described above. The UDR may inform of the access type state of the terminal in steps S205 and S207 or S209 in FIG. 2, or the UDR may directly configure an event notification message, and may inform the AF of the access type by which the terminal is registered using an API such as "UDR_Event_Notify" after performing steps S205 and S207 or S209 in FIG. 2.

As a result according to an embodiment of the disclosure, if a 3rd-party AS obtains information about the access type by which the terminal is connected, the 3rd-party AS may optimally process services provided to the terminal served by the 3rd-party AS. For example, if the terminal is connected to the 5G system through WiFi, the 3rd-party AS may make adjustment so as to send a large amount of data or streaming data through the corresponding connection. This may reduce the load of the 3gpp access, while saving data fees of the terminal. Alternatively, if a terminal using voice over IP through the 3rd-party AS switches to connection through 3gpp access, the 3rd-party AS may make a switch in order to transmit voice over IP data through 3gpp access for reliable voice data transmission. This may improve the voice over IP service quality with respect to the user.

Second Embodiment

Consideration is being given to implementation of a 5G communication system in super-high-frequency (mmWave) bands (e.g., a 60 GHz band) so as to accomplish higher data rates. In order to reduce pathloss of radio waves and increase the propagation distance of radio waves in super-high-frequency bands, techniques, such as beamforming, massive multiple-input multiple-output (MIMO), full-dimensional MIMO (FD-MIMO), array antennas, analog beamforming, and large-scale antennas, are being discussed in 5G communication systems.

In addition, development is under-way for system network improvement in 5G communication systems, based on evolved small cells, advanced small cells, cloud radio access networks (cloud RANs), ultra-dense networks, device-to-device (D2D) communication, wireless backhaul, moving networks, cooperative communication, coordinated multi-points (CoMPs), reception-end interference cancellation, and the like.

Furthermore, in the 5G system, hybrid FSK and QAM modulation (FQAM) and sliding window superlocation coding (SWSC), as advanced coding modulation (ACM), and filter bank multi-carrier (FBMC), non-orthogonal multiple access (NOMA), and sparse code multiple access (SCMA), as advanced access technologies, are being developed.

Meanwhile, the architecture for implementing communication with a 3rd-party application server in the 3GPP next-generation communication system is under constant discussion. Accordingly, there is an increasing demand for a method of efficiently providing network functions of a core network (CN) to an external third-party application server and improvement thereof. As a technique using the same, a third-party application server may apply mobile edge computing (MEC). The MEC is a technique of installing a wireless base station or a GW near the wireless base station and applying distributed cloud computing technology thereto so as to deploy various services and caching content close to a user terminal, thereby alleviating congestion of a mobile core network and producing new local services. The MEC provides application developers or content providers with cloud computing capabilities and IT service environments at the mobile network edge. In particular, the MEC provides applications with ultra-low latency, a large capacity of bandwidth, and real-time network information access. Therefore, a third-party application service may make a request to the 5G system for using the MEC, which may use an API provided by the 5G system to the third-party application service through the NEF. Alternatively, an application server of a third-party application service may make a contract with the 5G system, and may directly communicate with a PCF of the 5G system without passing through the NEF, thereby requesting use of the MEC.

Hereinafter, for the convenience of description, some terms and names defined in the $3^{rd}$-generation partnership project long-term evolution (3GPP) standard may be used. However, the disclosure is not limited to the above terms and names, and may be equally applied to systems conforming to other standards.

A description of network entities or network nodes in the disclosure will be made as follows.

The 5G core network may include the following network functions. An access and mobility management function (AMF) is a network function of managing the mobility of a terminal. A session management function (SMF) is a network function of managing a packet data network connection provided to a terminal. A policy and charging function (PCF) is a network function of applying the service policy, the charging policy, and the policy of a PDU session of a mobile communication carrier to a terminal. A network exposure function (NEF) may access information for managing a terminal in the 5G network, and may execute configuration change of mobility management and configuration of mobility management context specialized to the corresponding terminal, subscription to mobility management events of the corresponding terminal, configuration of session management and session management context of the corresponding terminal, configuration of charging information of the corresponding terminal, request for change of a PDU session policy with respect to the corresponding terminal, and small-data transmission of the corresponding terminal.

In the disclosure, an application programming interface (API) may indicate an API provided by the 5G system to a 3rd-party AS, and the information provided by the core network functions may be used, obtained, or configured using the API. In other words, hereinafter, the API denotes an interface produced for an application server of an external network to access, obtain, or configure the network capability provided by e 3GPP core network.

That is, if a third-party application server wishes to obtain the location of a terminal in relation to mobility management, the third-party application server may obtain the location of the terminal from the core network using an API for obtaining the location of the terminal (for example, a location-reporting API). Alternatively, when requesting change of traffic routing with respect to a session used by the terminal, the third-party application server may change a routing path for the PDU session provided to the terminal by a core network using an API supporting traffic steering (e.g., a traffic steering API).

Figure 3:
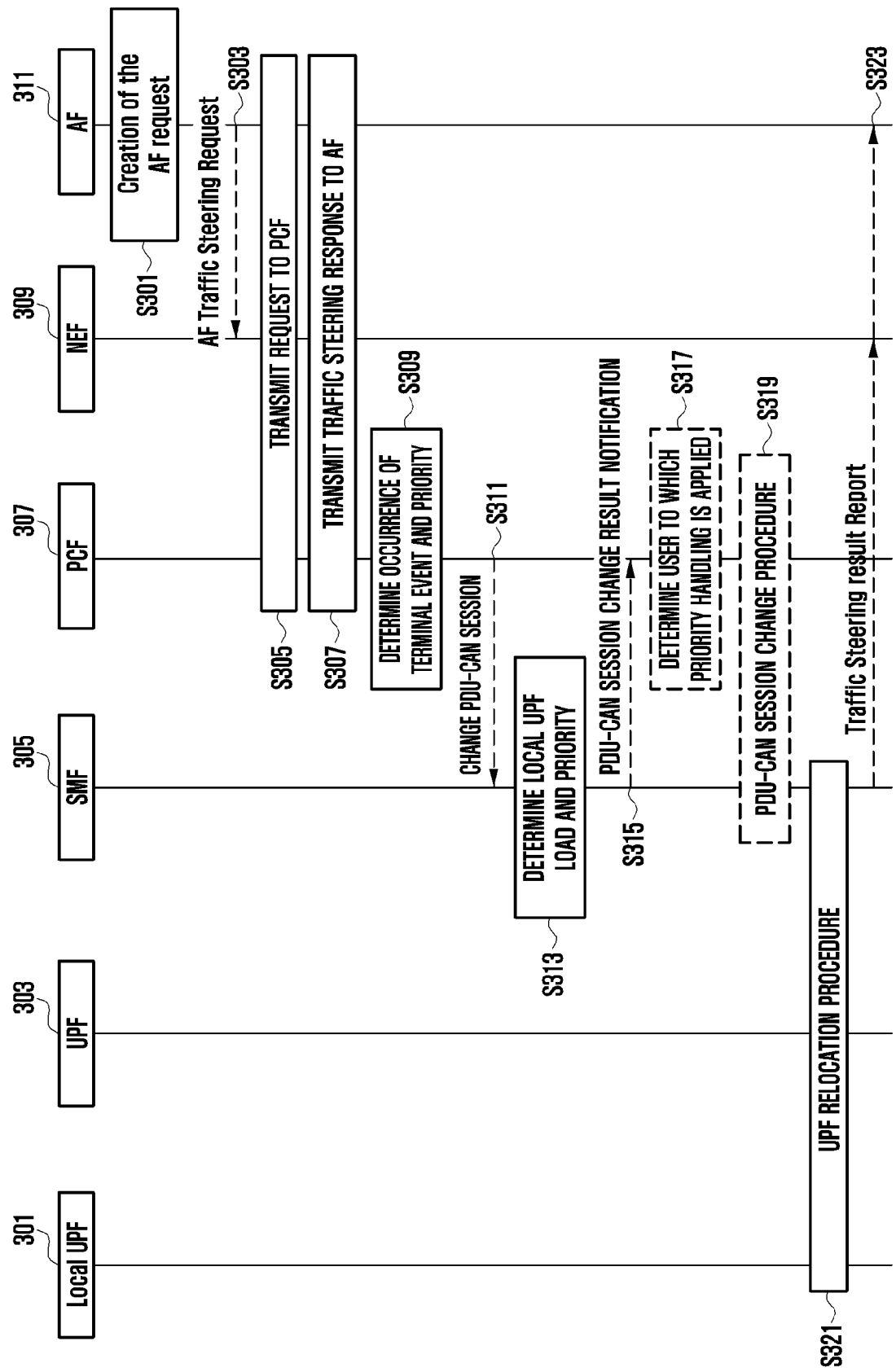
FIG. 3 is a diagram illustrating a procedure in which an AF, which is a third-party application server, makes a request to a 5G system for changing a traffic path and the 5G system connects a PDU session of a terminal to a corresponding local data network, according to an embodiment of the disclosure.

FIG. 3 is a diagram illustrating a procedure in which an AF, which is a third-party application server, makes a request to a 5G system traffic path change and the system connects a PDU session of a terminal to a corresponding local data network, according to an embodiment of the disclosure.

The procedure of changing a traffic path of a terminal according to request from a third-party application server in the disclosure is shown in FIG. 3. The embodiment of the disclosure relates to a method in which a third-party application server makes a request to the 5G system for changing a traffic path according to priority information of a terminal subscribed to a third-party application service and the 5G system applies the same.

In the disclosure, the third-party application service server is called an "application function (AF)", which is not limited to the third-party application service and includes any kind of application server using the 5G system.

In step S301 in FIG. 3, the AF produces a traffic steering (traffic path change) request of the terminal. When producing the request, the AF determines a terminal ID (e.g., an external ID) for identifying the terminal in the 5G system. The 5G system may determine an outstanding terminal in the 5G network using the terminal ID, which is based on subscription information of the terminal. Alternatively, the terminal may be identified using the IP address of the terminal currently used by the terminal while performing IP communication with the AF, instead of the terminal ID. In this case, the IP address or IP prefix of the terminal, instead of the terminal ID, is included in the request. In addition, the AF may group a plurality of UEs for requesting traffic steering, and may use a group ID (e.g., an external group ID) for identifying the group. The group ID is also an ID capable of determining a corresponding group and UEs belonging to the group in the 5G system, which may be determined based on 5G network subscription information of the respective UEs.

That is, if the terminal subscription information of the 5G system includes an external D or an external group ID, it is possible to identify the terminal or group requested by the AF. In addition, the AF may configure information on the local data network or the local GW that the corresponding terminal or the corresponding group is to access as a list of data network access identifiers (DNAIs) (or identifiers of user plane access to the DN), and may include the same in the request. In addition, the AF may include, in the request, a time condition for performing traffic steering, an effective time for which traffic steering is required, or the location of terminal where traffic steering must be performed.

According to an embodiment of the disclosure, the AF may include a priority of the terminal or a group for the services provided by the AF in the request for each terminal or group of terminals. This priority value may be understandable in the 5G system, and to this end, a value or information, which is previously agreed with the 5G system, or standard information may be used. Alternatively, the priority value may be a value obtained by negotiation between the PCF and the AF, and the PCF may change the same to a priority used in the 5G system, and may then use the same. As another example, in the case where the AF makes a request to the PCF for traffic steering via the NEF, if the AF transmits a priority of an application service level to the NEF, the NEF may change the same to a priority that can be used in the 5G system, and may then transmit the same.

The priority may have the following format according to a specific embodiment of the disclosure.

1) Numeric priority levels: In this case, the priority values may be integers from 1 to N, such as 1 to 10 or 1 to 100. "1" may represent the highest priority, or may represent the lowest priority, which follows the rules previously agreed with the 5G system or conforms to standards. Alternatively, the priority value may represent a class of the terminal. Therefore, a terminal belonging to a specific class may be represented as a value of the class (e.g., 1 to 3), and may be classified into a higher class, a next class, or a lower class. In the same class, the terminal with a highest priority may be processed first.

2) Priority levels in allocation and retention priority (ARP) format: in this case, the priority value may also be represented as numbers using predetermined values or standard values from 1 to N as described above. The ARP itself may indicate a high priority or a low priority. In addition, the ARP may be used in operation of releasing a previously established connection and processing a request for a terminal having a higher ARP value through inter-UE comparison. For example, assuming that ARP 1 represents the highest priority and ARP 10 represents the lowest priority, if a user request of ARP 10 and a user request of ARP 1 are received, the user request of ARP 1 is preferentially processed. As another example, in the case where the local GW or local data network is too congested to receive another user in the state in which a user of ARP 10 is connected to the local data network to be provided with a service, if a request from a user of ARP 1 is received, the user of ARP 10 may be disconnected from the local data network and a connection of the user of ARP 1 may be established. Local connection release and macro connection establishment according to the ARP will be described in the specific embodiment of the disclosure.

In step S303 in FIG. 3, the AF transmits a request message configured as described above to the NEF. This may be applied to the case where the AF is not directly connected to the PCF of a mobile communication carrier. That is, since the AF has no direct connection with the PCF, the request message configured in step S301 is transmitted through the NEF, which serves to connect the external network to the internal network. Upon receiving the request message, the NEF identifies the AF that has transmitted the request message and identifies whether or not the corresponding request message is to be transmitted to the PCF.

In addition, the NEF may map the request transmitted by AF to information that is to be used in traffic steering in the 5G system. For example, if the request transmitted by the AF includes location information, the location information may be mapped to a value, which can be recognized by the 5G system, such as a cell ID, a tracking area ID, or the like. In addition, the NEF may determine whether or not the AF is authorized to request traffic steering. Alternatively, the NEF may identify subscription information to check whether or not the corresponding terminal supports a traffic steering service with respect to a specific AF through the terminal ID. The NEF may negotiate with a subscriber server to proceed with the above approval procedure, and may transmit a request rejection message to the AF if the approval procedure fails.

Step S305 in FIG. 3 includes a method in which the NEF receiving the request of the AF in step S303 transmits an AF traffic steering request to the PCF, or a method in which the AF completing the configuration of the request message in step S301 directly transmits the request message to the PCF. If the AF is able to be directly connected to the PCF of the 5G system, the AF traffic steering request configured in step S301 may be directly transmitted to the PCF without passing through the NEF.

Upon receiving the message in step S305, the PCF may check whether or not the AF is authorized to make the corresponding request, or may check whether or not the corresponding request is able to be applied to the terminal or the group of terminals. Alternatively, the PCF may check whether or not location information or priority information, among the values requested by the AF, can be processed by the PCF. If it is identified that the request of the AF can be processed as a result of the checking above, the PCF transmits, to the AF, a response to the request in step S307 in FIG. 3. In the case where the request is received from the AF through the NEF, the response message is transmitted to the NEF, and the NEF identifies and transmits the same to the AF. In the case where the request is directly received from the AF without passing through the NEF, the PCF directly transmits the response to the AF request to the AF.

In operation S309 in FIG. 3, the PCF stores a time condition for performing traffic steering, an effective time for which traffic steering is required, or the location of terminal where traffic steering must be performed according to the request of the AF received in step S305. The PCF determines whether or not traffic steering with respect to the request of the AF is required to be applied to the PDU session currently used by the terminal. This may be determined based on a time condition, a location condition, an effective time, and the like, which are received according to the AF request. To this end, the PCF may register an event for the location change of the terminal in the SMF with respect to the location of the terminal, and, if the SMF recognizes that location of the terminal has been changed, the SMF may transmit an event notification indicating the same to the PCF.

The PCF may determine whether or not to apply the AF request, based on the location or time of the terminal, and may then apply the same to the PDU session used by the terminal, or the terminal of the group of terminals, requested by the AF. Alternatively, the PCF may check conditions according to the AF request when the corresponding terminal establishes a new PDU session, and, if the conditions are method, may apply the traffic steering rule.

According to an embodiment of the disclosure, when applying the AF request, the PCF identifies the priority included in the AF request. If there are several terminals to which the AF request is to be applied, the PCF performs step 6 to process the request of the terminal having the highest priority. If the terminals have the same priority, the request may be processed in a first-in first-out manner.

In step S311 in FIG. 3, the PCF notifies the SMF of change of the PDU-CAN session, and transmits a rule for traffic steering thereto. At this time, the PCF may include the priority requested by the AF. The PCF may not transmit the priority requested by e AF to the SMF. In this case, the PCF determines the priority and performs a PDU-CAN session change procedure, which will be described later.

The SMF receives a policy rule for the PDU-CAN session used by the terminal in step S311 in FIG. 3, and the rule includes a traffic steering rule. If the SMF receives the priority from the PCF, the SMF may process the terminal having a higher priority when changing the PDU session of the terminal to a local UPF according to the traffic steering rule in step S313 in FIG. 3. If the terminals have the same priority, the terminals may be processed in a first-in first-out manner, or any terminal may be processed first.

If the SMF determines the load of the local UPF, the SMF may not perform traffic steering to the local UPF with respect to the corresponding terminal. This is due to the fact that the local UPF is so crowded that it won't work properly if it accepts more users. However, according to an embodiment of the disclosure, if the SMF is able to determine the priority of the terminal with respect to the traffic steering request, the SMF may select a terminal having a lower priority from among the terminals using the local UPF, may release the local UPF connection of the corresponding terminal, and, according to a traffic steering request for a terminal having a higher priority, may connect the corresponding terminal to the local UPF. In this case, the SMF selects a terminal having a low priority, which is to be disconnected from the local UPF, based on the priority of the terminal included in the traffic steering rule, and performs an UPF relocation procedure in order to move the terminal to another UPF. This corresponds to step 11 in FIG. 3 and follows the UPF relocation procedure of 3GPP TS 23.502.

The SMF may determine the following criteria when selecting a terminal having a low priority according to a specific embodiment.

1. The lowest priority,
2. The priority lower than the request currently being processed,
3. The terminal having the longest inactivity of the MU session, among the terminals corresponding to 1 or 2, that is, the terminal that has not transmitted data for a long time, or
4. The terminal that uses a largest amount of data or uses the lowest data in the PDU session to the local UPF, among the terminals corresponding to 1 or 2.

After changing the PDU session of the terminal having a lower priority from the local UPF to another UPF, the SMF applies a traffic steering request for the terminal having a higher priority. Since the connection of a low-priority terminal (one or more terminals) has been switched from the congested local UPF to another UPF, the SMF may change the PDU session connection for the high-priority terminal to the local UPF. This follows step 11 and follows the UPF relocation procedure of 3GPP TS 23.502. In this case, another UPF may be another local UPF, or may be a macro UPF covering a wide area. If there are several local UPFs, the SMF may apply the traffic steering request to the high-priority terminal by selecting the nearest or quietest local UPF.

If the SMF has not received, from the PCF, the priority for the terminal to which the traffic steering rule is to be applied, according to an embodiment of the disclosure, the SMF determines the load of the local UPF in step 8 in FIG. 3 and provides the PCF with a cause indicating that the request was not successfully processed due to the congestion of the local UPF when notifying the PCF of the PDU-Can session change result. That is, the SMF informs the PCF of traffic steering failure. In this case, the notification of traffic steering failure may include a terminal identifier or a PDU session ID for identifying the PDU-CAN session, information indicating the saturation state of the local UPF, such as a DNAI and a congestion indication, or the session states of the terminals currently using the corresponding local UPF. Upon receiving the same, the PCF determines a user or a terminal to which the priority process is to be applied in step S317.

That is, since the local UPF is congested, the PCF separates the lowest priority terminal or the terminals having lower priorities than the terminal to which the current traffic steering rule is to be applied from other terminals using the corresponding local UPF and selects one or more terminals therefrom. In the case where a plurality of terminals is selected, the PCF may randomly select one of the terminals, may select the terminal having the longest inactivity of the PDU session, that is, the terminal that has not transmitted data for a long time, or may select the terminal that uses a largest amount of data or uses the lowest data in the PDU session to the local UPF. The PCF having selected the terminal to be preferentially processed in step S317 performs a PDU-CAN session change procedure in step S319 in order to release the local UPF connection of the selected terminal to the SMF and change the traffic path thereof to another UPF. During the operation in step S319, the PCF may perform a PDU-CAN session change request so as to perform traffic steering again on the terminal having a higher priority for which traffic steering has failed in step S315. Upon receiving the PDU-CAN session change request, the SMF performs an operation of changing the PDU session connection of the terminal having a lower priority to another UPF and relocating the PDU session connection of the terminal having a higher priority to the local UPF, which follows step 11 in FIG. 3.

After completing the UPF relocation procedure, the SMF may inform the AF that the traffic steering request of the AF for the terminal having a higher priority has been successfully processed. This notification may be transmitted to the AF through the NEF, or the SMF may directly transmit the notification to the AF if the SMF is directly connected to the AF. In addition, this notification may include information about the terminal relocated to another UPF due to its low priority, and the AF receiving the same may utilize information (DNAI or location) about the relocated UPF in order to provide constant services to the corresponding terminal.

As another method, the PCF being aware of the traffic steering failure of the SMF through step S315 in FIG. 3 may notify the AF of the same. Alternatively, the SMF may immediately transmit the failure to the AF, and if the direct connection is impossible, the SMF may provide the notification to the AF through the NEF. Upon receiving the notification, the AF may transmit another DNAI, i.e., access information to another local UPF to the PCF, thereby requesting traffic steering to the corresponding DNAI. If the process of the request fails even with a higher priority, the AF may newly make a request for changing the local UPF connection of another terminal having a lower priority to another UPF connection (or macro UPF). Therefore, if the terminal having a lower priority is disconnected from the corresponding local UPF, a local UPF connection of the terminal having a higher priority may be established. In the case where the process of the request fails due to its lower priority, in order to increase the priority of the corresponding terminal, the AF may allow the user to subscribe to a plan that charges more money, or may perform a method of charging the user in an on-demand manner to have a temporary priority through in-application signaling. If the priority information of the user is changed in this way, the AF may transmit a traffic steering request with a higher priority to the PCF.

In steps S305 to S323 in FIG. 3, the priority of the terminal may be interpreted as the priority of a group to which the terminal belongs. Accordingly, priority processing of the traffic steering request is determined based on the priority of the group to which the terminal belongs, and the terminal belonging to a group having a higher priority has the priority for connection to the local UPF. The method of selecting one terminal from a low-priority group may be performed by using a class value of the terminal, by selecting the terminal having the longest inactivity of the PDU session, that is, the terminal that has not transmitted data for a long time, or by selecting the terminal that uses a largest amount of data or uses the lowest data in the PDU session to the local UPF.

Figure 4:
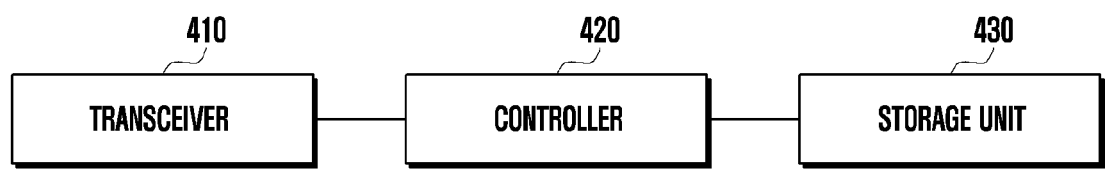
FIG. 4 is a diagram illustrating the structure of a terminal according to an embodiment of the disclosure.

FIG. 4 is a diagram illustrating the structure of a terminal according to an embodiment of the disclosure.

Referring to FIG. 4, the terminal may include a transceiver 410, a controller 420, and a storage unit 430. In the disclosure, the controller may be defined as a circuit, application-specific integrated circuit, or at least one processor.

The transceiver 410 may transmit and receive signals to and from other network entities.

The controller 420 may control the overall operation of the terminal according to the embodiments proposed by the disclosure. For example, the controller 420 may control a signal flow in order to perform the operations described with reference to FIGS. 1, 2, and 3. More specifically, the control unit 420 may perform control such that a third-party application server according to an embodiment of the disclosure negotiates with a 5G system, makes a request to the same for monitoring a change in state information of a terminal, and receives a result thereof. In addition, the controller 420 may perform control such that a third-party application server according to another embodiment of the disclosure makes a request to the 5G system for changing the traffic path of a terminal to be closer to the location of the terminal, whereby the 5G system changes the traffic path of the terminal to a local data network close to the location of the terminal, thereby supporting shorter latency and broadband transmission.

The storage unit 430 may store at least one piece of information transmitted and received through the transceiver 410 and information produced through the controller 420.

Figure 5:
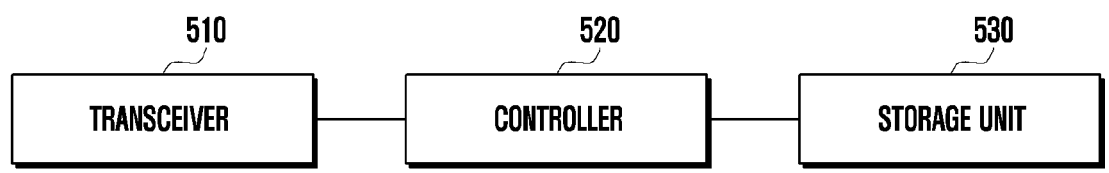
FIG. 5 is a diagram illustrating the structure of a network entity according to an embodiment of the disclosure.

FIG. 5 is a diagram illustrating the structure of a network entity according to an embodiment of the disclosure. The network entity shown in FIG. 5 represents the structure of each of the network entities shown in FIGS. 1, 2, and 3. For example, the network entity in FIG. 5 may be implemented as any one of the non3gpp access, the N3IWF, the AMF, the UDR, the NEF, and the AF shown in FIG. 2. For example, the network entity in FIG. 5 may be implemented as any one of the local UPF, the UPF, the SMF, the PCF, the NEF, and the AF shown in FIG. 3.

Referring to FIG. 5, the network entity may include a transceiver 510, a controller 520, and a storage unit 530. In the disclosure, the controller may be defined as a circuit, application-specific integrated circuit, or at least one processor.

The transceiver 510 may transmit and receive signals to and from a terminal or other network entities.

The controller 520 may control the overall operation of the network entity according to the embodiments proposed by the disclosure. For example, the controller 520 may control a signal flow in order to perform the operations described with reference to FIGS. 1, 2, and 3.

More specifically, the control unit 520 may perform control such that a third-party application server according to an embodiment of the disclosure negotiates with a 5G system, makes a request to the same for monitoring a change in state information of a terminal, and receives a result thereof. In addition, the controller 520 may perform control such that a third-party, application server according to another embodiment of the disclosure makes a request to the 5G system for changing the traffic path of a terminal to be closer to the location of the terminal, whereby the 5G system changes the traffic path of the terminal to a local data network close to the location of the terminal, thereby supporting shorter delay time and broadband transmission.

The storage unit 530 may store at least one piece of information transmitted and received through the transceiver 510 and information produced through the controller 520.

The invention claimed is:

1. A method of operating a policy and charging function (PCF) in a wireless communication system, the method comprising:
   receiving, from an application function (AF) operating as a third party application server, a first message requesting a traffic path change of a terminal, wherein the first message includes identification information of the terminal, priority information of the terminal for a service provided by the AF, and traffic steering conditions;
   determining whether traffic steering is required based on the traffic steering conditions included in the first message; and
   transmitting, to a session management function (SMF), a second message including a traffic steering rule based on the first message as a result of determination,
   wherein the traffic steering conditions include two or more of a time condition for performing traffic steering, an effective time for which traffic steering is to be performed, or a location of terminal at which traffic steering is to be performed.

2. The method of claim 1, wherein the identification information of the terminal includes at least one of an external ID for identifying the terminal in the wireless communication system, an IP address or IP prefix used by the terminal in communication with the AF, and a group ID associated with the terminal.

3. The method of claim 1, wherein the first message is transmitted from the AF to the PCF through a network exposure function (NEF), when the PCF is not directly connected to the AF.

4. A method for providing an application service to a terminal of a wireless communication system at an application function (AF) operating as a third party application server, the method comprising:
   producing a first message including identification information of a terminal, priority information of the terminal for a service provided by the AF, and traffic steering conditions;
   transmitting, to a policy and charging function (PCF) in the wireless communication system, the first message;
   receiving, from the PCF, a response message corresponding to the first message; and
   receiving, from a session management function (SMF), a second message including a traffic steering result for the terminal,
   wherein the traffic steering result indicates whether a protocol data unit (PDU) session connection of the terminal is changed based on the first message, and
   wherein the traffic steering conditions include two or more of a time condition for performing traffic steering, an effective time for which traffic steering is to be performed, or a location of terminal at which traffic steering is to be performed.

5. The method of claim 4, wherein the identification information of the terminal includes at least one of an external ID for identifying the terminal in the wireless communication system, an IP address or IP prefix used by the terminal in communication with the AF, and a group ID associated with the terminal.

6. The method of claim 4, wherein the first message is transmitted from the AF to the PCF through a network exposure function (NEF), when the PCF is not directly connected to the AF.

7. A policy and charging function (PCF) in a wireless communication system, the PCF comprising:
   a transceiver; and
   a controller connected to the transceiver and configured to control to:
     receive, from an application function (AF) operating as a third party application server, a first message requesting a traffic path change of a terminal, wherein the first message includes identification information of the terminal, priority information of the terminal for a service provided by the AF, and traffic steering conditions,
     determine whether traffic steering is required based on the traffic steering conditions included in the first message, and
     transmit, to a session management function (SMF), a second message including a traffic steering rule based on the first message as a result of determination,
   wherein the traffic steering conditions include two or more of a time condition for performing traffic steering, an effective time for which traffic steering is to be performed, or a location of terminal at which traffic steering is to be performed.

8. The PCF of claim 7, wherein the identification information of the terminal includes at least one of an external ID for identifying the terminal in the wireless communication system, an IP address or IP prefix used by the terminal in communication with the AF, and a group ID associated with the terminal.

9. The PCF of claim 7, wherein the first message is received through a network exposure function (NEF), when the PCF is not directly connected to the AF.

10. An application function (AF) operating as a third party application server, the AF comprising:
    a transceiver; and
    a controller connected to the transceiver and configured to control to:

produce a first message including identification information of a terminal, priority information of the terminal for a service provided by the AF, and traffic steering conditions, transmit, to a policy and charging function (PCF), the first message, receive, from the PCF, a response message corresponding to the first message, and receive, from a session management function (SMF), a second message including a traffic steering result for the terminal, wherein the traffic steering result indicates whether a protocol data unit (PDU) session connection of the terminal is changed based on the first message, and wherein the traffic steering conditions include two or more of a time condition for performing traffic steering, an effective time for which traffic steering is to be performed, or a location of terminal at which traffic steering is to be performed.

11. The AF of claim 10, wherein the identification information of the terminal includes at least one of an external ID for identifying the terminal, an IP address or IP prefix used by the terminal in communication with the AF, and a group ID associated with the terminal.

12. The AF of claim 10, wherein the first message is received through a network exposure function (NEF), when the AF is not directly connected to the PCF.

* * * * *